UNITED STATES PATENT OFFICE.

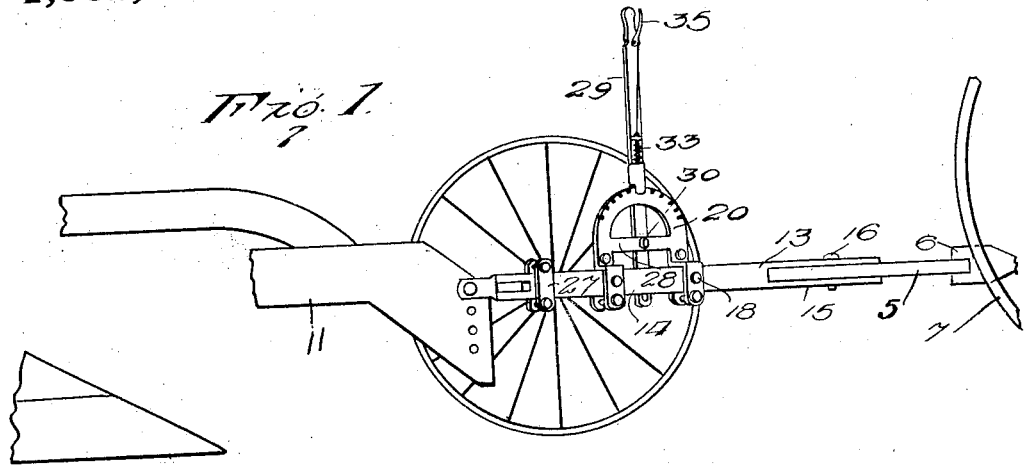
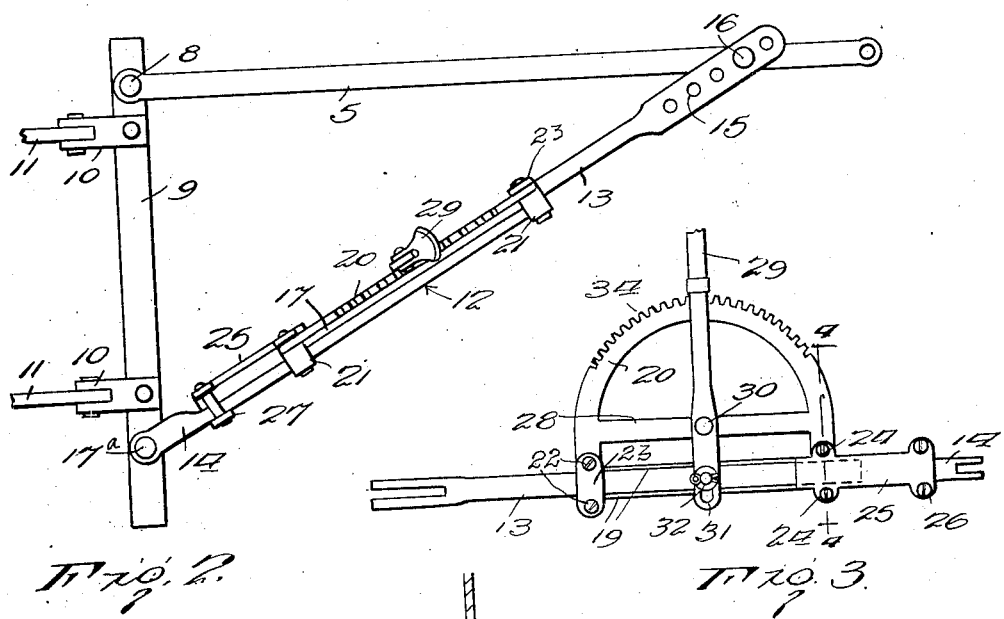
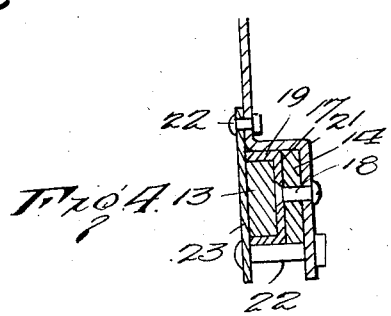

GERALD SCHMID, JOSEPH SCHMID, ANTON E. BRICHACEK, AND HUGH TULLY, OF SCHUYLER, NEBRASKA.

ADJUSTABLE DRAFT CONNECTION.

1,382,554.   Specification of Letters Patent.   Patented June 21, 1921.

Application filed March 8, 1919. Serial No. 281,566.

*To all whom it may concern:*

Be it known that we, GERALD SCHMID, JOSEPH SCHMID, ANTON E. BRICHACEK, and HUGH TULLY, citizens of the United States, residing at Schuyler, in the county of Colfax and State of Nebraska, have invented certain new and useful Improvements in Adjustable Draft Connections, of which the following is a specification.

This invention has for its object to provide an adjustable draft connection for plows and other implements whereby the latter may be connected with a tractor and permitted a relatively wide range of adjustment relatively thereto.

A further object of the invention is the provision of an adjustable draft connection embodying an exceptionally simple and compact adjusting mechanism by which the length of the brace rod may be varied to correspondingly vary the angular relation of the main draft bar to the beams of the plow.

With the above and other objects in view as will appear as the description proceeds, the invention comprises the novel features of construction, combination and arrangement of parts which will be more fully described hereinafter and set forth with particularity in the claims appended hereto.

In the drawings:—

Figure 1 represents a fragmentary side elevation of a tractor and plow illustrating the adjustable draft connection applied thereto, Fig. 2 represents an enlarged plan view of the draft connection, Fig. 3 represents a fragmentary side elevation of the adjusting device for the brace rod, and Fig. 4 represents a fragmentary sectional view on the line 4—4 of Fig. 3.

Referring to the drawings in detail, wherein similar reference numerals designate corresponding parts throughout the several views, the numeral 5 indicates the usual draft bar designed for attachment at its front terminal with a draft member 6 of a tractor, a fragment of which is illustrated in Fig. 1 and designated by the numeral 7. The rear extremity of the main draft bar is pivotally connected at 8 with the transverse beam 9 having connection by clevises 10 with the plow or implement carried draft beams 11.

The brace rod designated generally by the numeral 12 connects the forward portion of the main draft bar 5 with the transverse beam 9 at a point remote from the connection of said main draft bar with the beam 9. The bracing bar is of sectional structure and consists of the front and rear sections 13 and 14, respectively, the front section being bifurcated at the front terminal and provided with series of vertically alined apertures 15 receiving a pivot pin 16 establishing an adjustable pivotal connection between the front terminal of the brace bar and the main draft bar 5. The rear terminal of the rear section 14 is also bifurcated and pivotally receives a pin 17ª by which it is pivotally connected with the terminal portion of the transverse beam 9. A longitudinally grooved guide 17 is rigidly attached by rivets 18 or equivalent means to the front extremity of the rear section 14 and the spaced parallel flanges 19 thereof embrace and confine the rear terminal of the front section 13 which is mounted for longitudinal movement in the guide 17.

A substantially semi-circular rack segment 20 provided with extended angular terminals 21 is arranged above the portions of the front and rear sections which lie spaced apart to either side of the guides 17 and the angular extremities of the rack segment partially embrace the flanged guide 17 and the rear section 14. At points above and below the extensible brace 12, the front leg or extended terminal of the rack segment is fitted with bolts 22 which extend through a vertically disposed strap 23 overlying the flanges 19 of the grooved guide and confining the slidable front section in position therein. The flanges in addition to confining the sliding movement of the front section constitute spacing elements for maintaining the strap 23 in such position as to afford free movement of the front section with relation to the guide. The angular leg or extended terminal at the rear of the rack segment 20 is secured by means of bolts 24 which are also extended through the front terminal of a plate 25 confining the rear terminal of the bar section 13 and the guide 17 and assisting in maintaining the rack segment in an upright operative position. The plate 25 is extended a distance rearwardly of the rack segment to provide a guide for the rear extremity of the front section 13 and is held in position by bolts 26 extended through laterally projected ears carried by the plate 25 and through a strap 27 lying against the lateral face of the rear section 14.

The extended terminals of the rack segment 20 are connected by a brace rod 28 arranged above and in parallel relation to the extensible brace 12 and constituting a pivotal support for the hand lever 29 which is pivotally secured at 30 to the bar 28 and is provided at its lower terminal with a longitudinal slot 31 receiving a laterally projecting pin 32 carried by the front section 13 whereby oscillatory movement of the lever is transmitted to the section 13 to move the latter longitudinally with relation to the section 14.

The lever is provided with a spring actuated pawl 33 adapted to engage the recesses 34 of the rack segment whereby the lever is locked in adjusted position and the pawl is controlled in the usual manner by a hand grip 35 pivotally secured to and extending in proximity to the handle of the lever.

What we claim is:—

1. In combination, parallel bar sections arranged side by side, a flanged guide interposed between the bar sections and slidably receiving one section, a rack segment having offset ends embracing the other bar section, means rigidly connecting said offset ends, second mentioned bar section and guide, plates secured to the offset ends of the segment engaging the flanges of the guide and confining the first mentioned bar section therein, a brace rod carried by the segment, and a lever pivotally secured to the brace rod and engaged with one of the slidable bar sections for actuating the latter.

2. In combination, parallel bar sections arranged side by side, a flanged guide engaged with one of the sections and slidably receiving the other section between the flanges thereof, an inverted U-shaped rack segment having extended and offset ends embracing and securing the first mentioned section and guide, plates attached to the offset ends of the rack segment engaging the flanges of the guide and confining the relatively movable section therein, one of said plates being extended outwardly of the rack segment in the direction of the bar sections and constituting a guide for the inner terminal of the slidable bar section, means connecting the extended end of the plate with the first mentioned bar section for preventing the inner terminal of the slidable bar section from extending outwardly, a brace rod connecting the extremities of the U-shaped segment, a manually operable lever pivotally secured to the brace rod, and means connecting the extremity of the lever with the slidable bar section.

In testimony whereof we affix our signatures hereto.

GERALD SCHMID.
JOSEPH SCHMID.
ANTON E. BRICHACEK.
HUGH TULLY.

In presence of—
Geo. W. Wertz.